Patented Feb. 21, 1950

2,498,538

UNITED STATES PATENT OFFICE 2,498,538

SYNTHETIC MANUFACTURE OF UREA

Jean Leon Maurice Frejacques, Paris, France, assignor to Compagnie de Produits Chimiques et Electrometallurgiques Alais, Froges et Camargue, Paris, France, a corporation of France No Drawing. Application July 22, 1947, Serial No. 762,813. In France March 18, 1941

Section 1, Public Law 690, August 8, 1946
Patent expires March 18, 1961

2 Claims. (Cl. 260—555)

This invention relates to improvements in the synthetic manufacture of urea.

It is known that urea can be obtained synthetically by heating under pressure ammonium carbamate obtained by combination of carbon dioxide and ammonia. Only a fraction of the carbamate is converted into urea and it is necessary either to utilize in an associated manufacture the fraction of carbon dioxide and ammonia from the carbamate which is not converted, or to return these residual gases into the cycle of urea synthesis.

In this last case, it has already been proposed to prepare by means of the residual gases an oily suspension of ammonium carbamate which is thereupon injected into the synthesis autoclave. This suspension of carbamate can be prepared either with the residual gases together with the addition of ammonia and carbon dioxide in amounts corresponding to the fraction converted into urea, or only with the residual gases, the fresh gases then being injected directly into the synthesis autoclave.

For example, in the French patent specification 826,280, dated December 9, 1936, there is prepared in advance, in a first vessel working at low pressure, an oily suspension of ammonium carbamate, by passing into an inert viscous liquid, not miscible with water, such as a mineral oil of sufficiently low volatility, the residual carbon dioxide and ammonia derived from a preceding operation for formation of urea, excluding any fresh carbon dioxide and ammonia. The carbamate paste thus prepared is then injected into the high pressure synthesis autoclave, heated to high temperature, in which the formation of urea takes place, and at the same time as the fresh carbon dioxide and ammonia are added. After a suitable length of stay in the autoclave, the mixture containing oil or other inert viscous liquid, the unchanged carbamate and the urea and water formed, is extracted from the autoclave, preferably continuously, through the top of the apparatus. The mixture, released at a lower pressure, is delivered to the top of a fractionating column, heated at its lower part, in which there is completed the dissociation of the residual carbamate, already commenced by the reduction in pressure, into carbon dioxide and ammonia. From the bottom of this column, there are extracted the oil and the urea formed, which are separated by decantation. The oil returns into the cycle of manufacture, whereas the urea solution is passed to the crystallizing and evaporating apparatus. From the top of the column there escape the residual carbon dioxide and ammonia, which are passed, together with the oil recovered, into the cooled apparatus in which the oily suspension of carbamate is formed.

In all these processes, the inert viscous liquid is brought into contact with the carbon dioxide and ammonia, necessary for the preparation of carbamate, in apparatus working at atmospheric pressure or at low pressure and distinct from the high pressure apparatus in which the dehydration of the carbamate into urea is carried out. Their value lies in the fact that they allow convenient recovery of the residual gases and that they facilitate the reintroduction of those gases into the synthesis circuit. But the synthesis in presence of oil presents other subsidiary advantages, which cause it to be valuable even in the case where the uncovered carbon dioxide and ammonia can be utilized in an associated manufacture.

It has already been mentioned, in the French patent specification No. 826,280, dated December 9, 1936, that the combination of ammonia and carbon dioxide evolves a considerable quantity of heat which it is necessary to eliminate at the level of the autoclave, that is to say at a point where the reacting mixture is particularly corrosive and attacks the majority of ordinary metals or alloys and that the surfaces necessary for the exchange of heat units are fairly large and that the corrosion is proportional to these surfaces; and moreover, that it is difficult to recover the heat units evolved.

In the processes referred to above, these drawbacks are obviated by passing into the autoclave for formation of urea, the oil or other inert viscous liquid containing carbamate in suspension. According to the present invention, these same difficulties are easily obviated by injecting into the autoclave for formation of urea, and at the same time as the fresh ammonia and carbon dioxide, a hydrocarbon oil or other inert viscous hydrocarbon liquid not containing any carbamate in suspension. The heat units evolved serve to heat the oil and the supply of oil can be regulated in such a way as to obtain the temperature desired for the reaction. The heat units thus stored in the oil are not lost. They are manifested at the moment of the reduction in pressure, causing by simple fall of pressure the dissociation of the residual carbamate, thus reducing considerably the quantity of heat to be supplied at the bottom of the fractionating column. The recovery of the heat units is thus almost automatic and is obtained very simply. The recovery of the oil and of the urea solution does not involve any supplementary difficulties; it is carried out easily, by mere decantation, on condition however of having in the mixture only very little iron oxide derived from corrosion of the apparatus. This condition can be obtained either by utilizing special steels rich in chromium, very little affected by the reaction mixture, or by arranging the autoclave so that the said mixture can only come into contact with non-ferrous metals or alloys, such as lead, tin and bronzes.

In the known processes referred to above, the whole of the mixture of oil and carbamate is prepared at a lower pressure than that existing in the synthesis autoclave, and in an apparatus distinct therefrom. According to the present invention the carbamate is formed, wholly or in part, in presence of hydrocarbon oil or other inert viscous hydrocarbon liquid, in the synthesis autoclave itself and at the same pressure. It is possible, indeed, according to a first method of operation, to form the whole of the ammonium carbamate in the synthesis autoclave itself by injecting into the latter, at the same time as the ammonia and the carbon dioxide, a hydrocarbon oil or other inert viscous hydrocarbon liquid not containing any ammonium carbamate prepared in advance; or again, it is possible to form a part only of the ammonium carbamate in this synthesis autoclave, that is to say, to adopt a method of operation intermediate between that which has just been specified above and the one described in the French patent specification No. 826,280; this intermediate method of operation can be employed in the case where it is desired to deliver to an associated manufacture only a part of the residual ammonia and carbon dioxide, and not the whole.

The operation is then conducted by passing only a part of the oil into the apparatus for preparation of the oily suspension of carbamate which is to be injected into the urea synthesis autoclave, and the other part directly into the synthesis autoclave. The fraction of the residual carbon dioxide and ammonia which it is desired to pass into another process is extracted in this case either at the top of the fractionating column, or at the exit from the apparatus for preparation of the oily suspension.

In this latter case it suffices to cool the said apparatus to a greater or less extent in order to regulate the proportion of gases which combines in the state of carbamate in relation to that which is to be utilized in another manufacture. In fact, the heat units evolved by the reaction of formation of carbamate must be eliminated in order that the temperature shall not rise above that which corresponds to the dissociation of the carbamate under the working pressure utilized and in order that the formation of carbamate shall be possible. The more intense the cooling, the greater will be the quantity of carbamate formed and the lower will be the quantity of carbon dioxide and ammonia leaving the apparatus in an uncombined state.

The process according to the invention allows therefore at will either of recovering the residual carbon dioxide and ammonia and returning them wholly into the circuit, or of returning only a portion of them into the circuit, or of utilizing in an associated manufacture the residual gases not converted into urea.

What I claim is:

1. In a process for the synthetic manufacture of urea by heating carbon dioxide with ammonia under pressure in an inert viscous liquid, the step of separately injecting a heat absorbent consisting of an inert viscous hydrocarbon liquid into the reaction zone, at the same time as the carbon dioxide and ammonia, whereby the carbamate formation takes place under pressure in the said zone and in the presence of the said heat absorbent hydrocarbon liquid, and whereby the reaction temperature is regulated by regulating the quantity of hydrocarbon liquid injected.

2. In a process for the synthetic manufacture of urea by heating carbon dioxide with ammonia under pressure in an inert viscous liquid, the steps of separately injecting a heat absorbent consisting of an inert viscous hydrocarbon liquid into the reaction zone, at the same time as the carbon dioxide and ammonia, whereby the carbamate formation takes place under pressure in the said zone and in the presence of the said heat absorbent hydrocarbon liquid, and controlling the reaction temperature by varying the amount of inert viscous hydrocarbon liquid so injected.

JEAN LEON MAURICE FREJACQUES.

REFERENCES CITED

The following references are of record in the file of this patent:

UNITED STATES PATENTS

| Number | Name | Date |
|---|---|---|
| 1,945,314 | Hofsasz | Jan. 30, 1934 |

FOREIGN PATENTS

| Number | Country | Date |
|---|---|---|
| 826,280 | France | Jan. 4, 1938 |
| 488,404 | Great Britain | July 6, 1938 |
| 226,227 | Switzerland | June 16, 1943 |
| 587,770 | Great Britain | May 6, 1947 |